(12) United States Patent
Couvee et al.

(10) Patent No.: US 11,561,934 B2
(45) Date of Patent: Jan. 24, 2023

(54) DATA STORAGE METHOD AND METHOD FOR EXECUTING AN APPLICATION WITH REDUCED ACCESS TIME TO THE STORED DATA

(71) Applicant: BULL SAS, Les Clayes-sous-Bois (FR)

(72) Inventors: Philippe Couvee, Villard-Bonnot (FR); Simon Derr, Fontaine (FR); Antoine Percher, Paris (FR)

(73) Assignee: BULL SAS, Les Clayes-sous-Bois (FR)

( * ) Notice: Subject to any disclaimer, the term of this patent is extended or adjusted under 35 U.S.C. 154(b) by 228 days.

(21) Appl. No.: 16/958,314

(22) PCT Filed: Dec. 20, 2018

(86) PCT No.: PCT/FR2018/053447
§ 371 (c)(1),
(2) Date: Jul. 15, 2020

(87) PCT Pub. No.: WO2019/129958
PCT Pub. Date: Jul. 4, 2019

(65) Prior Publication Data
US 2021/0064575 A1 Mar. 4, 2021

(30) Foreign Application Priority Data
Dec. 27, 2017 (FR) ...................................... 1763236

(51) Int. Cl.
*G06F 16/00* (2019.01)
*G06F 16/172* (2019.01)
(Continued)

(52) U.S. Cl.
CPC ............. *G06F 16/172* (2019.01); *G01W 1/10* (2013.01); *G06F 16/183* (2019.01)

(58) Field of Classification Search
CPC .... G06F 16/172; G06F 16/183; G06F 3/0631; G06F 3/064; G06F 3/067; G06F 3/0605; G06F 16/131; G06F 16/182; G01W 1/10
See application file for complete search history.

(56) References Cited

U.S. PATENT DOCUMENTS 7,010,532 B1 * 3/2006 Stakutis ................ G06F 16/172
707/625
8,296,812 B1 * 10/2012 Ganesan .......... H04N 21/47202
725/90

(Continued)

OTHER PUBLICATIONS

International Search Report of the International Searching Authority for PCT/FR2018/053447 dated Apr. 25, 2019.
(Continued)

*Primary Examiner* — Noosha Arjomandi
(74) *Attorney, Agent, or Firm* — Meagher Emanuel Laks Goldberg & Liao, LLP

(57) ABSTRACT

The invention concerns a storage method for storing, on data servers (3, 4), data file (5, 61 to 64) slices (51 to 58) from the execution of a plurality of processes (65 to 68) of one or more applications (83, 85), comprising: distributing the stored data file (5, 61 to 64) slices (51 to 58) over different data servers (3, 4), characterized in that: this distribution is carried out in such a way that the data file (5, 61 to 64) slices (51 to 58) likely to be subsequently accessed simultaneously by different application (83, 85) processes (65 to 68) are stored on different data servers (3, 4) so as to reduce the subsequent access, to each of all or part of these data servers (3, 4) by too many application (83, 85) processes (65 to 68) simultaneously, and in that: the determination of the data file (5, 61 to 64) slices (51 to 58) likely to be subsequently accessed simultaneously by different application (83, 85) processes (65 to 68) has been carried out, during a prior phase of executing these application (83, 85) processes (65

(Continued)

to 68), by observing the behavior of these application (83, 85) processes (65 to 68) in order to access these stored data file (5, 61 to 64) slices (51 to 58) over time.

11 Claims, 4 Drawing Sheets

(51) Int. Cl.
    *G06F 16/182*     (2019.01)
    *G01W 1/10*     (2006.01)

(56) References Cited

U.S. PATENT DOCUMENTS

| | | | |
|---|---|---|---|
| 8,769,238 B1 * | 7/2014 | Sivasubramanian | G06F 3/06 711/112 |
| 10,410,137 B2 * | 9/2019 | Kvernvik | G06F 11/3452 |
| 11,144,503 B2 * | 10/2021 | George | G06F 3/0607 |
| 2011/0078512 A1 * | 3/2011 | Grube | G06F 11/2053 714/E11.159 |
| 2013/0073522 A1 * | 3/2013 | Chen | G06F 16/182 707/687 |
| 2015/0205818 A1 * | 7/2015 | Darcy | G06F 16/182 707/822 |
| 2019/0230151 A1 * | 7/2019 | Falcao | G06F 16/183 |
| 2021/0064575 A1 * | 3/2021 | Couvee | G06F 3/064 |
| 2021/0240768 A1 * | 8/2021 | Tiwary | G06F 16/11 |
| 2021/0390080 A1 * | 12/2021 | Tripathi | G06F 21/62 |

OTHER PUBLICATIONS

English translation of International Search Report of the International Searching Authority for PCT/FR2018/053447 dated Apr. 25, 2019.

* cited by examiner

| Period | File A 61 | File B 62 | File C 63 | File D 64 |
|---|---|---|---|---|
| 1 | - | - | - | - |
| 2 | T1 611 | T2 622 | T3 633 | T4 644 |
| 3 | T1 611 | T2 622 | T3 633 | T4 644 |
| 4 | - | - | - | - |
| 5 | - | - | - | - |

DATA STORAGE METHOD AND METHOD FOR EXECUTING AN APPLICATION WITH REDUCED ACCESS TIME TO THE STORED DATA

FIELD OF THE INVENTION

The invention relates to the field of data storage methods with a reduction in the time to access the stored data, and also the field of methods for executing corresponding application(s) using these data storage methods.

CONTEXT OF THE INVENTION

According to a first prior art, since the time to access stored files, whether in read or write mode, is overall a not insignificant amount of time in the total run time of an application, it is provided to reduce this time to access stored files by making each read operation and each write operation quicker, often at the cost of a more complex and more expensive technology.

A first disadvantage of this first prior art is that this more complex and more expensive technology, in particular for several applications each managing a large amount of data, makes the overall system complex and expensive.

A second disadvantage of this first prior art is that, according to the invention, even once each read operation and each write operation has been made very quick, if there are a large number thereof to be executed, and this is in particular the case for several applications each managing a large amount of data, the overall time to access the stored data remains large, or even very large, on the scale of the overall run time of the applications. This time to access stored files is particularly significant at the scale of the running of applications, when the running of these applications is executed during a highly sizable data processing process, such as for example a large calculation, since then, the numerous periodic phases of backing up the data ("checkpoints") intrinsically take up a large proportion of the overall run time of this processing process, for example of the order of 10 to 20 minutes every hour.

According to a second prior art, the optimization of the run time is above all focused on reducing the calculation time of the applications.

On the one hand, this second prior art is often only concerned with reducing the calculation time of the application, since this calculation time is considered to be better controlled and more important. Nonetheless, according to the invention, reducing the input/output time, i.e. the read/write time at each partial result backup, will first of all be able to become fruitful since this backup time may take from 10% to 30% of the total execution time of an application, and subsequently can be performed regardless of the internal logic of the application.

On the other hand, in this second prior art, managing access to the storage zones and managing the associated bottlenecks are often considered to be likely to generate a significant, prohibitive extra expense, which will be even more true when the application calculations are repetitive, since in this case managing bottlenecks would become a serious problem. However, according to the invention, this is not entirely true, especially if this management is carried out by observing the access behavior of the processes of the application to the storage zones during the execution of the application under real conditions, and if it is followed by a corresponding adaptation of the distribution of the data storage zones based on the manner in which this data will subsequently have to be accessed by the processes of the application.

Finally, managing the input/output time could be carried out upstream of the execution of the application, i.e. at the level of an optimization of the distribution of the data which would then be carried out by an upstream design phase which, of course, would then save on the time of the observation phase.

However, according to the invention, this would be carried out at the cost of two major disadvantages, which would be on the one hand the total dependence of the application in relation to a single type of storage system and on the other hand the increased difficulty of developing the application which has to integrate this additional constraint.

SUMMARY OF THE INVENTION

The aim of the present invention is to provide a storage method that at least partially overcomes the above-mentioned disadvantages.

More particularly, the invention aims to provide a data storage method and an application execution method which, rather than being limited either to reducing each file access time or else only to optimizing the calculation time of the applications, and in particular in seeking to over-optimizing this calculation time of the applications, considers that it is particularly beneficial on the one hand to seek to rationalize and organize the access time to files stored by applications, and on the other hand to carry out this rationalization and this organization effectively, firstly by being based on the actual running of the applications and on their actual interaction, by observing them in their actual operation, and subsequently by proposing principles for rationalization and organization at the level of the strategy for accessing the stored files, which will be more independent both of the type of servers storing the data and of the type of applications being run, thereby affording increased robustness to changes.

To this end, the present invention proposes a storage method which can adapt either to data file slices or even to groups of data, or else to data object slices, this storage being carried out on different data servers, or even on different data server storage spaces, these different data server storage spaces, or else these different data servers, being accessible separately and independently of one another by applications external to their data servers. To this end, the present invention also proposes a method for executing processes of application(s) corresponding to one or the other of these storage methods, and more particularly to the method for storing data file slices on different data servers.

According to the invention, a storage method is firstly provided for storing, on data servers, data file slices from the execution of a plurality of processes of one or more applications, comprising: distributing the stored data file slices over different data servers, characterized in that: this distribution is carried out in such a way that the data file slices likely to be subsequently accessed simultaneously by different application processes are stored on different data servers so as to reduce the subsequent access, to each of all or part of these data servers by too many application processes simultaneously, and in that: the determination of the data file slices likely to be accessed simultaneously by different application processes has been carried out, during a prior phase of executing these application processes, by observing the behavior of these application processes in order to access these stored data file slices over time.

Thus, a noteworthy reduction in the mean input/output time is obtained in data read and/or write mode, for all the calculation phases, at the cost of only a temporary increase during one or more initial calculation phases making it possible to better distribute the stored data based on their subsequent access by the different application processes over time. This thus makes it possible to avoid congestion at the data servers.

According to the invention, a storage method is subsequently provided for storing, on data servers storage spaces, data file slices from the execution of a plurality of processes of one or more applications, comprising: distributing the stored data file slices over different storage spaces of different data servers, characterized in that: this distribution is carried out in such a way that the data file slices likely to be subsequently accessed simultaneously by different application processes are stored on different storage spaces of different data servers so as to reduce the subsequent access, to each of all or part of these storage spaces, by too many application processes simultaneously, and in that: the determination of the data file slices likely to be accessed simultaneously by different application processes has been carried out, during a prior phase of executing these application processes, by observing the behavior of these application processes in order to access these stored data file slices over time.

Thus, a noteworthy reduction in the mean input/output time is obtained in data read and/or write mode, for all the calculation phases, at the cost of only a temporary increase during one or more initial calculation phases making it possible to better distribute the stored data based on their subsequent access by the different application processes over time. This thus makes it possible to avoid congestion at the storage spaces managed by data servers.

According to the invention, a method is also provided for executing a plurality of processes of one or more applications, comprising: a first phase of observing the running of said processes and the manner in which they access, over time, the stored data during said execution, during which the determination of the data file slices likely to be accessed simultaneously by different application processes is carried out, a second phase of parametrization of the storage of the data by said processes on data servers and on the storage spaces thereof, associating, with the data file slices, storage spaces on the data servers, a third phase of distributing the stored data file slices over different data servers and over the storage spaces thereof, this distribution being carried out such that the data file slices likely to be subsequently simultaneously accessed by different application processes are stored on different data servers, where appropriate on different storage spaces of these data servers, so as to reduce the subsequent access, to each of all or part of these data servers, where appropriate of these storage spaces, by too many application processes simultaneously.

According to the invention, a storage method is further provided for storing, on data servers, data from the execution of a plurality of processes, comprising: distributing the stored data over different data servers, characterized in that: this distribution is carried out in such a way that groups of data likely to be subsequently accessed simultaneously by different processes are stored on different data servers so as to reduce the subsequent access, to each of all or part of these data servers, by too many application processes simultaneously, and in that: the determination of the groups of data likely to be accessed simultaneously by different processes has been carried out, during a prior phase of executing these processes, by observing the behavior of these processes in order to access these stored groups of data over time.

According to the invention, a storage method is finally provided for storing, on data servers, data object slices from the execution of a plurality of processes of one or more applications, comprising: distributing the stored data object slices over different data servers, characterized in that: this distribution is carried out in such a way that the data object slices likely to be subsequently accessed simultaneously by different application processes are stored on different data servers so as to reduce the subsequent access, to each of all or part of these data servers by too many application processes simultaneously, and in that: the determination of the data object slices likely to be accessed simultaneously by different application processes has been carried out, during a prior phase of executing these application processes, by observing the behavior of these application processes in order to access these stored data object slices over time.

In preferred embodiments, the invention comprises one or more of the following features which may be used separately or in partial combination with one another or in full combination with one another, with one or more of the aforementioned subjects of the invention.

Preferably, said determination of the data file slices likely to be simultaneously accessed by different application processes has been carried out, during a prior phase of execution of these processes for a single application or else application by application in the case of a plurality of applications, by observing the behavior of these processes of a single application at the same time in order to access these stored data file slices over time.

Thus, the optimization of the distribution of the data is only carried out at each application. This is much more simple and quicker, and virtually as effective, as carrying it out simultaneously for several applications likely to be executed simultaneously.

Preferably, the application(s) are portable to other types of data storage servers.

Thus, the application is therefore independent of a data storage system, and this is made possible because the optimization of the distribution of the data is carried out downstream, by a phase of observing the behavior of the application, instead of being carried out by an upstream design phase which, while it admittedly would save time in the observation phase, this would be at the cost of two major disadvantages which are on the one hand the total dependence of the application in relation to a single type of storage system and on the other hand the increased difficulty of developing the application which integrates this additional constraint.

Preferably, the processes of the application include repetitive calculations.

Thus, the observation phase will offer an excellent compromise, namely being simple and short and enabling high optimization of the distribution of the data storage zones, leading to a significant reduction in the input/output time during the running of the execution of the application.

Preferably, said repetitive calculations include calculations of weather forecasts.

Thus, the calculations of weather forecasts are a particularly critical example of highly repetitive and highly complex calculations, i.e. requiring lots of resources but enabling high optimization of the distribution of the data to storage zones, which may lead to a significant reduction in the input/output time during the running of the execution of the application.

Preferably, the application(s) are executed within a network comprising several thousand calculation nodes, preferably at least 5000 calculation nodes, preferably at least 10000 calculation nodes.

Thus, since the optimization of the storage is increasingly complex and critical in this type of large network, the invention then becomes increasingly beneficial.

Preferably, a maximum file slice size that can be stored in one go and a maximum number of storage spaces on which this file can be stored are associated with each file, the maximum file slice size preferably remaining less than 2 MB (MB=megabyte) and advantageously being equal to 1 MB, the maximum number of storage spaces preferably remaining less than 10 and advantageously being equal to 5.

Thus, this segmentation of the file into slices, and this distribution of the slices over a plurality of storage spaces, makes it possible to yet better reduce simultaneous accesses to the same storage space by too many application processes.

Preferably, said distribution of stored data file slices over different data servers or over different storage spaces of different data servers is carried out by a library of functions which: on the one hand intercepts the creation of data files, on the other hand carries out the storage of the slices of these data files on the storage spaces on the data servers associated therewith during said prior phase of execution of the application processes.

Thus, the data file slices are immediately and directly stored in the correct locations, which will subsequently reduce the time to access these data to file slices.

Other characteristics and benefits of the invention will become apparent upon reading the following description of a preferred embodiment of the invention, given as an example with reference to the attached drawings.

DETAILED DESCRIPTION OF THE INVENTION

Figure 1:
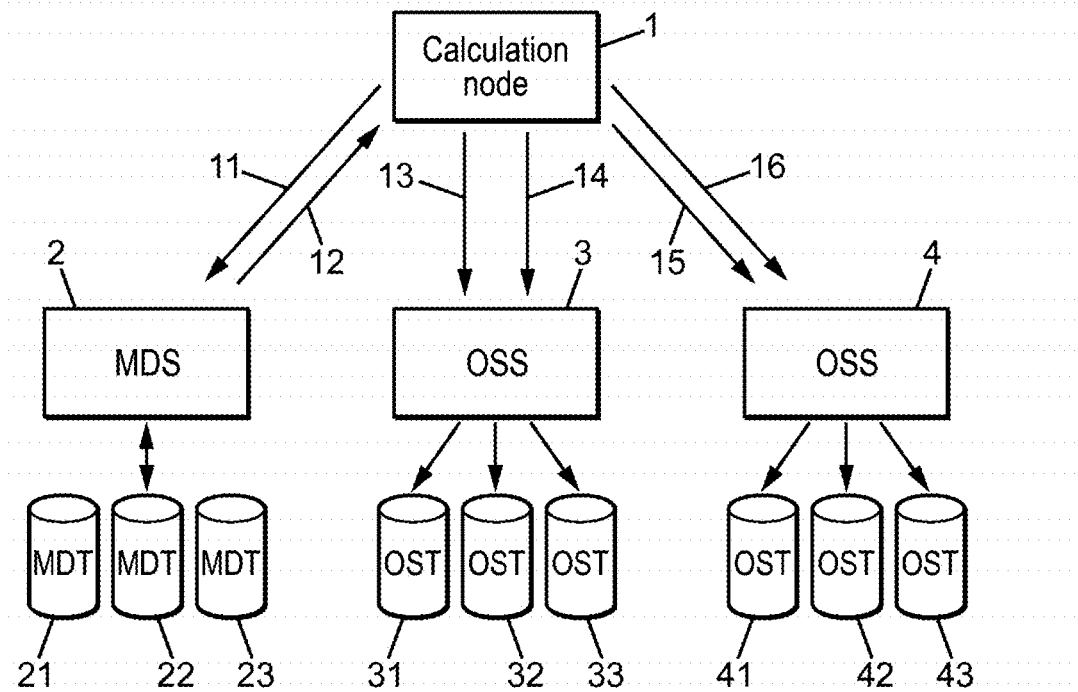
FIG. 1 schematically depicts an example of a storage system to which the storage method according to one embodiment of the invention can be applied.

FIG. 1 schematically depicts an example of a storage system to which the storage method according to one embodiment of the invention can be applied.

A calculation node 1 runs a calculation and occasionally needs to read and/or write data in data servers 3 and 4 using a metadata server 2. The data server 3 (OSS for "object storage server") comprises a plurality of data disk spaces 31 to 33 (OST for "object storage target"). The data server 4 comprises a plurality of data disk spaces 41 to 43. The metadata server 2 (MDS for "metadata server") comprises a plurality of metadata disk spaces 41 to 43 (MDT for "metadata target").

The language used by the calculation node to communicate with servers 2 to 4 is for example the language Lustre (open-source software language). The calculation node 1 sends a file open request 11 to the metadata server 2. The metadata server 2 returns a response 12 containing file attributes and identifiers. These attributes include a segmentation block size of the data file to be stored and also a list of data servers or even a list of data disk spaces. The calculation node 1 sends the data server 3 a data read request 13 or a data write request 14. The data server 3 reads or writes the data on one of the data disk spaces 31 to 33. The calculation node 1 sends the data server 4 a data read request 15 or a data write request 16. The data server 4 reads or writes the data on one of the data disk spaces 41 to 43.

Nowadays, the largest computers, also referred to as supercomputers, are composed of several thousand independent calculation nodes, such as the calculation node 1, collectively executing one or more parallel applications, i.e. an application is executed on a large number of calculation nodes 1

These supercomputers generally use, to access input data and to write the results, a file system which is itself parallel, generally composed of several tens of servers such as the data servers 3 and 4.

Figure 2:
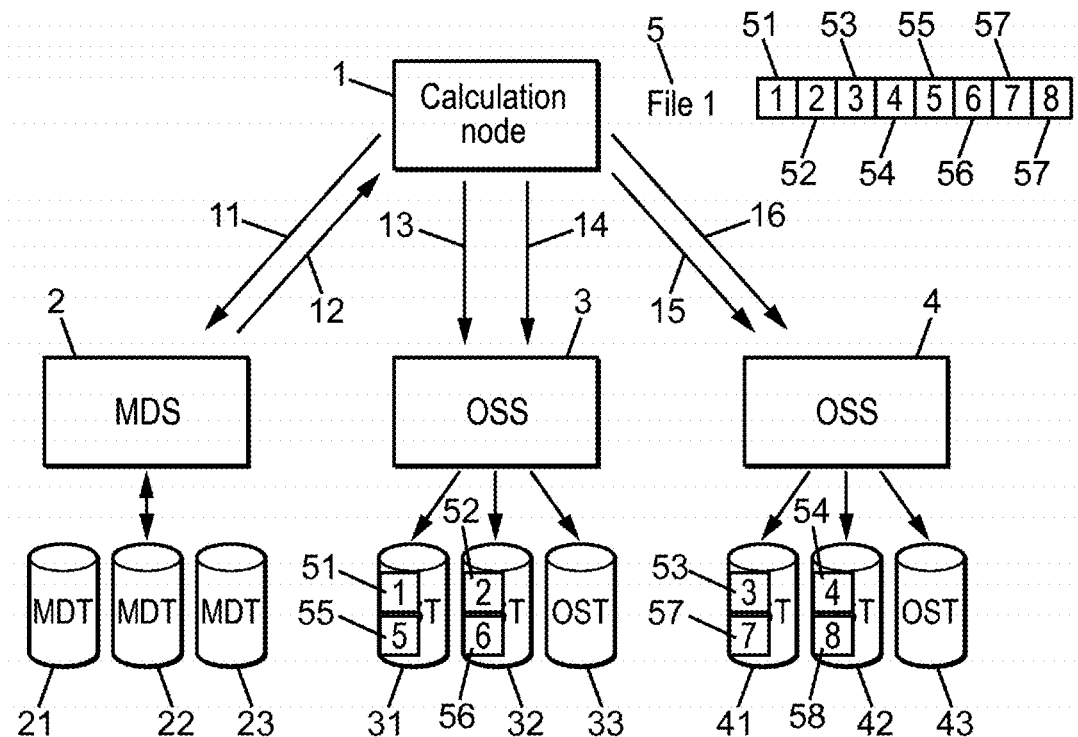
FIG. 2 schematically depicts an example of running a random storage method likely to generate the problem solved by the solution proposed by the storage method according to one embodiment of the invention.

FIG. 2 schematically depicts an example of running a random storage method likely to generate the problem solved by the solution proposed by the storage method according to one embodiment of the invention.

The calculation node 1 has a file 5 of data to be stored. The file 5 is segmented into eight slices 51 to 58. The data storage strategy is a random strategy, i.e. the file slices are stored randomly over all the data disk spaces which are assigned to the data file 5, in this case the the data disk spaces 31 and 32 of the data server 3 and the data disk spaces 41 and 42 of the data server 4. The data server 3 stores the slices 51 and 55 on the data disk space 31 and the slices 52 and 56 on the data disk space 32. The data server 4 stores the slices 53 and 57 on the data disk space 41 and the slices 54 and 58 on the data disk space 42.

During the creation of a file 5, the file system must choose which data servers 3 or 4 and which disk spaces 31 to 33 and/or 41 to 43 will be used to store its contents. The algorithms used nowadays are based on a random method ("round robin"), with the aim of randomly distributing the data over all the data servers 3 and 4 and to promote uniform filling.

The principle is that an elementary data slice size ("stripe") and a number of disk spaces 31 to 43 for each file 5 to be created are fixed in advance.

With these two values fixes respectively, for example, at 1 megabyte for the size of the slice and at four for the number of disk spaces 31 and 32 and 41 and 42 on data servers 3 and 4, it is then possible to have the random distribution as depicted in FIG. 2 for an 8 megabyte file. The four disk spaces 31 and 32 and 41 and 42 were randomly chosen by the file system to ensure uniform filling.

Figure 3:
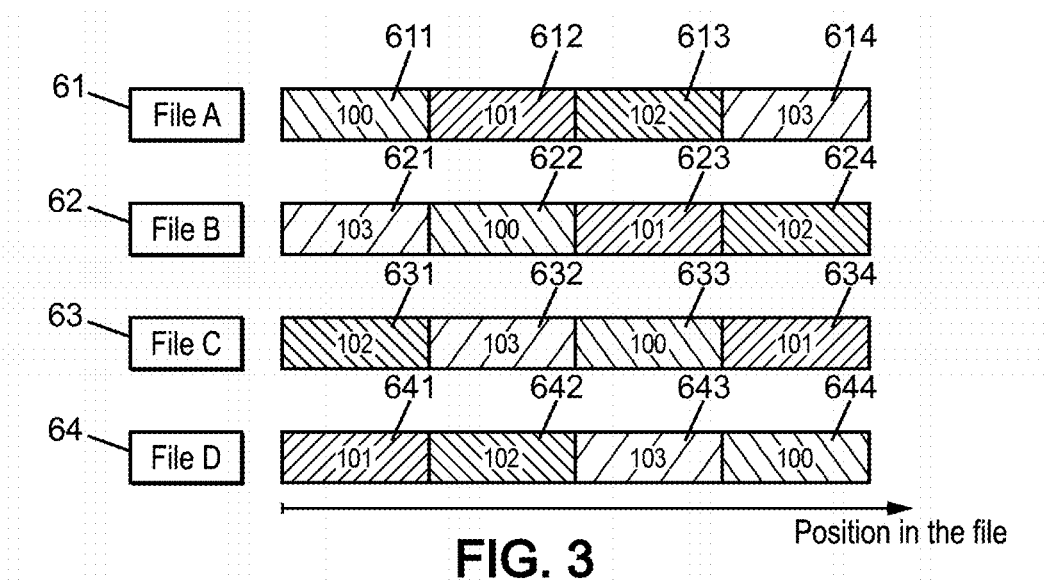
FIG. 3 schematically depicts an example of storage of data from a plurality of application files on a plurality of servers, generating the problem solved by the solution proposed by the storage method according to one embodiment of the invention.

FIG. 3 schematically depicts an example of storage of data from a plurality of application files on a plurality of servers, generating the problem solved by the solution proposed by the storage method according to one embodiment of the invention.

Four data files 61 to 64 each containing four data slices must be stored on four data servers 100 to 103. With a random storage strategy, the storage carried out is for example the following.

For the file 61, the first slice 611 is stored on the server 100, the second slice 612 is stored on the server 101, the third slice 613 is stored on the server 102, the fourth slice 614 is stored on the server 103.

For the file 62, the first slice 621 is stored on the server 103, the second slice 622 is stored on the server 100, the third slice 623 is stored on the server 101, the fourth slice 624 is stored on the server 102.

For the file 63, the first slice 631 is stored on the server 102, the second slice 632 is stored on the server 103, the third slice 633 is stored on the server 100, the fourth slice 634 is stored on the server 101.

For the file 64, the first slice 641 is stored on the server 101, the second slice 642 is stored on the server 102, the third slice 643 is stored on the server 103, the fourth slice 644 is stored on the server 100.

Scientific applications have different typical behaviors regarding access to data. A frequent typical behavior is the mode referred to as "file per process", in which each process of the parallel application, and there are up to several tens of thousands thereof, creates a file 5 in order to store the results it has calculated therein. In general, a subsequent step aggregates these partial results in order to more easily utilize them thereafter.

During the creation of such an amount of files 5 by an application, it is common for a plurality of files 5 to be created on the same disk spaces 31 to 43, given the limited number thereof compared to the number of calculation nodes 1. However, since the selection of the disk spaces 31 to 43 is made at the moment the file 5 is created, this mechanism cannot take into account the profiles of future accesses to the files5, and in particular the fact that these accesses are simultaneously carried out by a plurality of processes on their respective files 5, which has the effect of splitting the access performance across all the processes using it.

The conventional solution to this problem, as explained previously, consists in distributing the data from all the files 5 by segmenting each one into slices 51 to 58 distributed in turn over each of the disk spaces 31 and 32 and 41 and 42 of servers 3 and 4. However, this mechanism does not always make to it possible to respond to every usage case, and some remain particularly problematic.

Thus, the example of a parallel application with four application processes A, B, C and D. Each of these processes stores its data respectively in the files 61 to 64 which are all segmented into four slices and distributed over four data servers 100 to 103. In order to avoid the problems mentioned previously, the distribution of the data over the servers 100 to 103 is offset differently in each of the files 61 to 64, as shown in FIG. 3.

Figure 4:
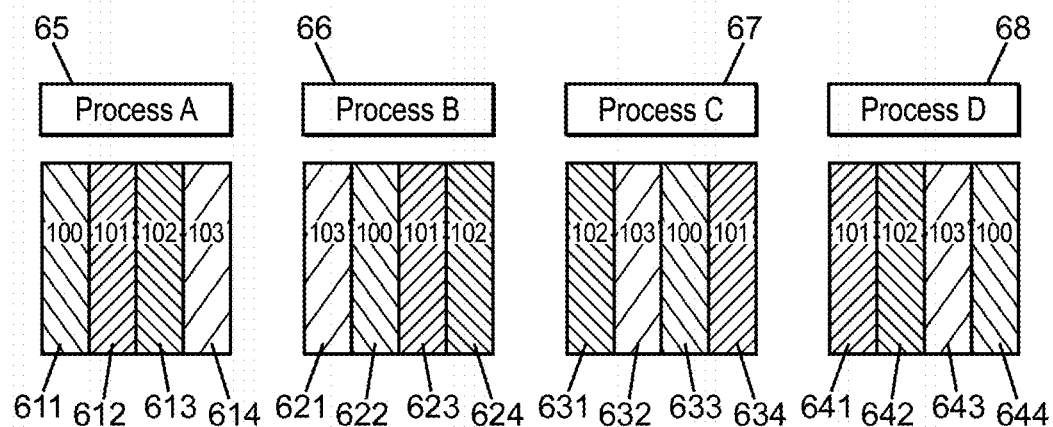
FIG. 4 schematically depicts an example of a first phase of running a plurality of application processes, generating the problem solved by the solution proposed by the storage method according to one embodiment of the invention.

FIG. 4 schematically depicts an example of a first phase of running a plurality of application processes, generating the problem solved by the solution proposed by the storage method according to one embodiment of the invention.

Four application processes 65 to 68 will have to access, over time, whether to read data or to write data, their respective files stored on the servers 100 to 103 as detailed in FIG. 3.

The data represent a local version of a data matrix model with four columns. Should the size of a column be of the same order of magnitude as that of a file slice, or else even just a multiple of a file slice, there is a correspondence between the columns of the matrix and the file storage slices 61 to 64.

Figure 5:
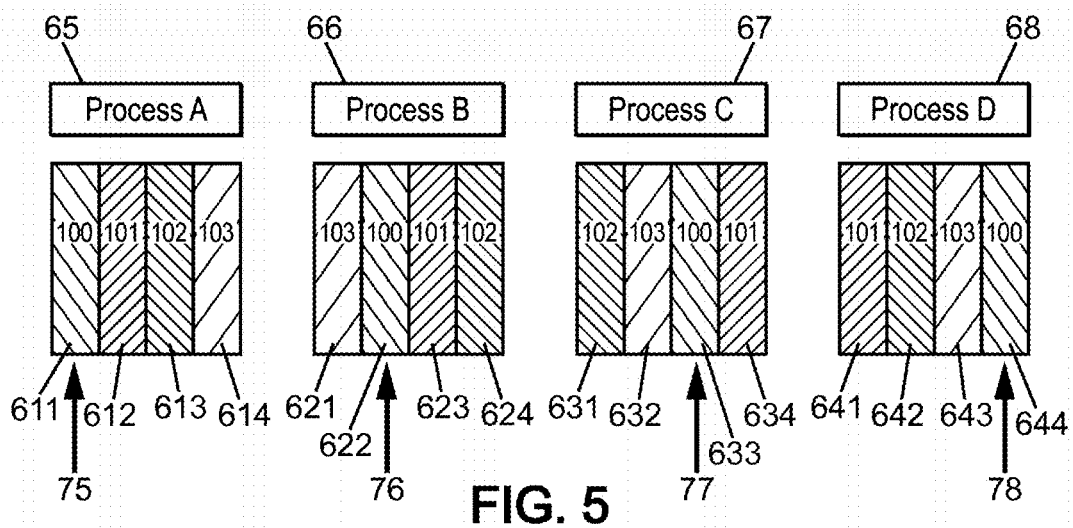
FIG. 5 schematically depicts an example of a second phase of running a plurality of application processes, generating the problem solved by the solution proposed by the storage method according to one embodiment of the invention.

FIG. 5 schematically depicts an example of a second phase of running a plurality of application processes, generating the problem solved by the solution proposed by the storage method according to one embodiment of the invention.

The four application processes 65 to 68 will have to access, over time, whether to read data or to write data, their respective files stored on the servers 100 to 103 as detailed in FIG. 3. Here, unfortunately, at the same moment, the process 65 wishes to access 75 the slice 611 stored on the server 100, the process 66 wishes to access 76 the slice 622 also stored on the server 100, the process 67 wishes to access 77 the slice 633 also stored on the server 100, the process 68 wishes to access 78 the slice 644 also stored on the server 100. The server 100, which the four processes 65 to 68 wish to access four times 75 to 78 simultaneously, will only be able to respond to these requests at a rate four times lower than its normal rate, which will multiply by four the overall time for carrying out the four accesses 75 to 78. This is an example of the drastic increase in the overall access time when simultaneous accesses unfortunately occur on the same server, on which server the data have been stored with a random strategy.

For reasons of data interdependency, at the end of the calculation, each of the processes 65 to 68 begins to write, into its result file, the data of the column corresponding to its row in the parallel calculation application. The result is while all the processes are "attacking" the same data server at the same time, in this case the server 100.

The immediate consequence of this behavior is an instant throughput of the server 100 which is divided by four compared to the optimal case. This is a particularly detrimental case implementing a particular application with particularly problematic data structure sizes. However, often, in a statistically more common reality, it will be possible to often find an application writing its data on a server approximately ten times slower than it could.

Figures 6, 7:
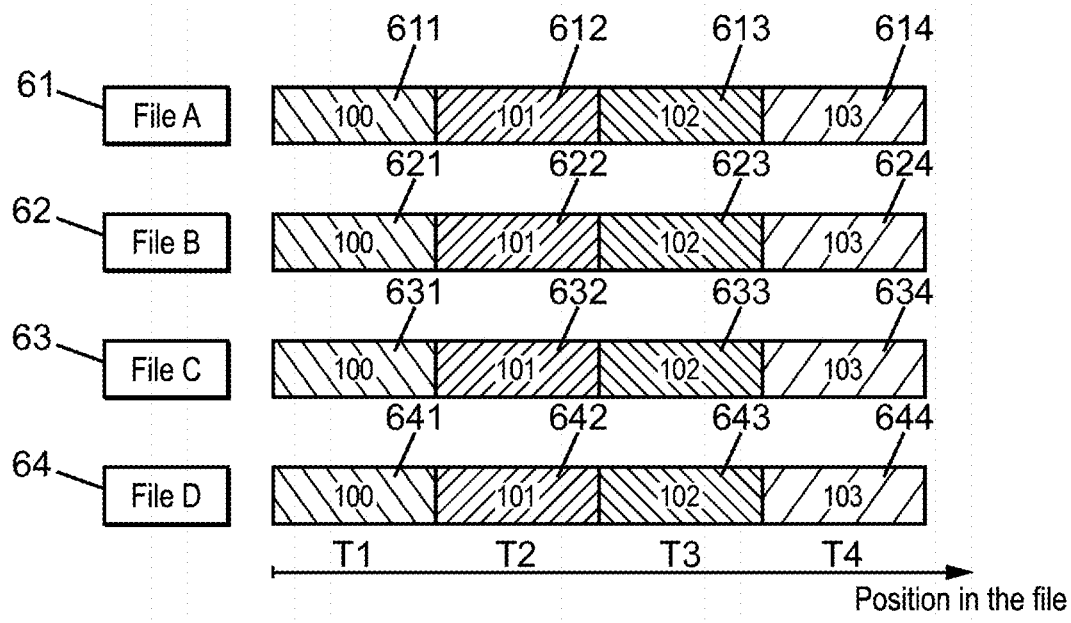
FIG. 6 schematically depicts an example of a first phase of running a to plurality of application processes using the solution proposed by the storage method according to one embodiment of the invention.
FIG. 7 schematically depicts an example of a second phase of running a plurality of application processes using the solution proposed by the storage method according to one embodiment of the invention.

FIG. 6 schematically depicts an example of a first phase of running a plurality of application processes using the solution proposed by the storage method according to one embodiment of the invention.

The table of FIG. 6 depicts the requirements for access to four files to 61 to 64 arranged in columns during five periods of time. These access requirements are identified during the phase of observation of the execution of the applications and of the corresponding storage of their data. During the first, fourth and fifth periods of time, no file needed to be accessed. However, during the second period of time, and also during the third period of time, the first slice 611 of the file 61, the second slice 622 of the file 62, the third slice 633 of the file 63, the fourth slice 644 of the file 64 have to be accessed simultaneously.

The solution proposed by this embodiment in order to solve this problem consists here in directing the creation of the files 61 to 64 over a set of data servers 100 to 103 from prior observations of executions of the processes 65 to 68 of the application(s) in order to determine the future behavior thereof in terms of simultaneous accesses to files 61 to 64. Thus, it will be possible to position the files 61 to 64 or even the slices of the files 61 to 64 accessed simultaneously by the processes 65 to 68 of application(s) on data servers 100 to 103 which are different if possible, or at least different for the majority of the file slices, or to carry out a uniform distribution, or at least more uniform, of the files 61 to 64, or of the slices of the files 61 to 64, accessed simultaneously on the available data servers 100 to 103.

The solution proposed by this embodiment of the is therefore based on the possibility of observing the behavior of an application or of processes of application(s) 65 to 68 during multiple executions and of storing it in a knowledge base in order to extract therefrom an ideal profile for the distribution of the files 61 to 64 created on the data servers 100 to 103.

In the field of the scientific calculation of supercomputers, it is common for the same application to be executed numerous times during a study campaign. For example, weather prediction bodies carry out the same calculations every few hours using the most up-to-date measurements of physical parameters.

Once the knowledge base is formed, an analysis can be carried out to detect the simultaneous accesses made by the processes 65 to 68 of the application(s). The accesses are classified by periods of access and by regions of files accessed, in the form of a slice number, as depicted in the table of FIG. 6.

FIG. 7 schematically depicts an example of a second phase of running a plurality of application processes using the solution proposed by the storage method according to one embodiment of the invention.

This time, by virtue of the prior observation phase, taking into account the access needs identified over time, instead of a predetermined random strategy, a different strategy determined after the fact based on the access requirements identified previously and adapted to these pre-identified access requirements is chosen. This different strategy, perfectly suited to the processes of the applications considered here, could not have been guessed without a prior observation phase, since this type of storage corresponding to storing all the same slices of each file on the same server is not a commonly used storage since, because it is perfectly symmetrical, it would rather, on the contrary, be considered to be a more likely cause of access bottlenecks, and to be more likely to cause bottlenecks in the exchange of data between application processes and storage servers.

More specifically, the data storage carried out is the same for all the slices of all the files. This storage is as follows.

For the file 61, the first slice 611 is stored on the server 100, the second slice 612 is stored on the server 101, the third slice 613 is stored on the server 102, the fourth slice 614 is stored on the server 103.

For the file 62, the first slice 621 is stored on the server 100, the second slice 622 is stored on the server 101, the third slice 623 is stored on the server 102, the fourth slice 624 is stored on the server 103.

For the file 63, the first slice 631 is stored on the server 100, the second slice 632 is stored on the server 101, the third slice 633 is stored on the server 102, the fourth slice 634 is stored on the server 103.

For the file 64, the first slice 641 is stored on the server 100, the second slice 642 is stored on the server 101, the third slice 643 is stored on the server 102, the fourth slice 644 is stored on the server 103.

The strategy will consist here in deducing, from the table of FIG. 6, that the slices of the same row of these four files 61 to 64 will be ideally placed on different data servers 100 to 103, in order to cause them all to work simultaneously and in parallel during the second and third periods of time. This corresponds to the ideal distribution of the files 61 to 64 on the data servers 100 to 103 as depicted in FIG. 7.

In order to obtain this placement, which would not be naturally generated by the system file, a mechanism is inserted which indicates to it how to carry out this ideal placement on the data servers 100 to 103 at the moment of creation of the file by the processes 65 to 68 of the application(s). This mechanism may in particular be implemented in the form of a library of functions intercepting the file creations of the processes of the application and carrying out this operation with predetermined parameters. This library will have access to the information on ideal placement of the files 61 to 64 which were developed from the analysis of previous executions.

Figure 8:
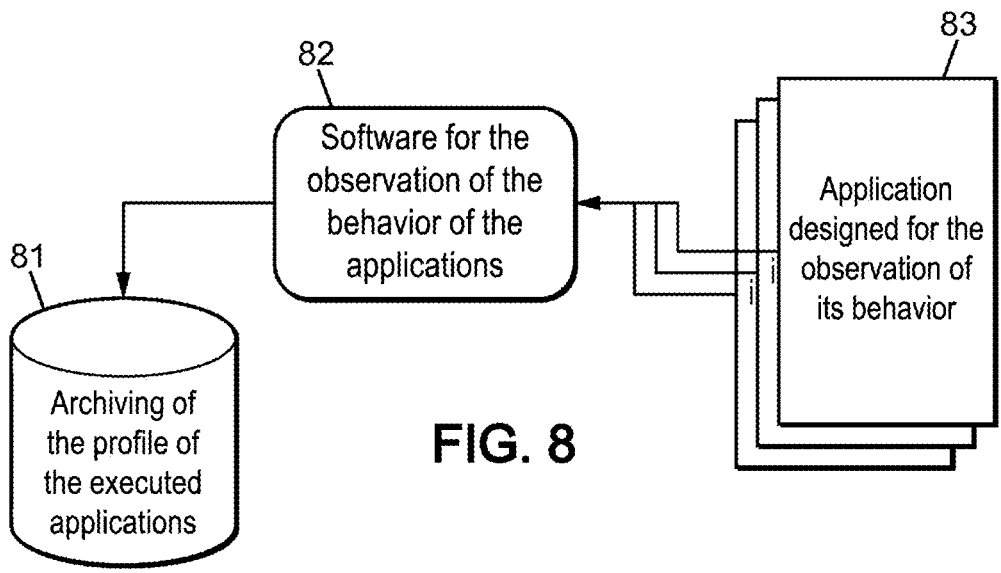
FIG. 8 schematically depicts an example of synthesis of the observation phase of the storage method according to one embodiment of the invention.

FIG. 8 schematically depicts an example of synthesis of the observation phase of the storage method according to one embodiment of the invention.

Different applications 83, or different processes of application(s), are to designed so that their behavior is observed during the running of their execution. During this observation phase, a software for observation 82 of the behavior of these applications 83 observes their behavior in order to determine the profile of each of the applications 83. Once determined, the profile of each application 83 is stored in a space for archiving 81 the profiles of the applications 83.

There will therefore be two phases in the implementation of the strategy proposed by this embodiment of the invention. In a first phase, represented in FIG. 8, the applications 83, or the processes of application(s), launched by users, will be observed in order to construct the knowledge base stored in an archive space 81.

Figure 9:
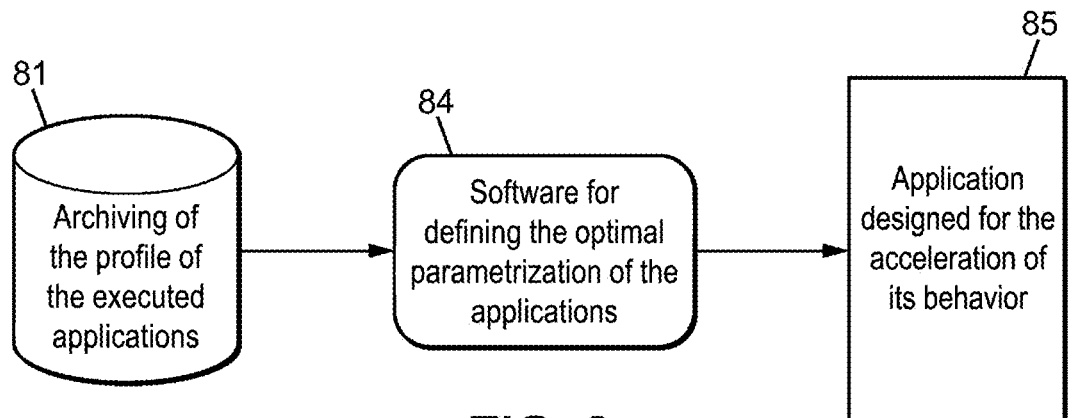
FIG. 9 schematically depicts an example of synthesis of the parametrization phase of the storage method according to one embodiment of the invention can be applied.

FIG. 9 schematically depicts an example of synthesis of the parametrization phase of the storage method according to one embodiment of the invention can be applied.

A software for the optimal parametrization 84 of the applications reads, in the space for archiving 81 the profiles of the applications 83, the profiles of the applications. Using each of these profiles of applications, this software for the optimal parametrization 84 of the applications will parametrize each of the applications in order for it to become an application 85 designed for the acceleration of its behavior, and more specifically for the reduction of its data exchange time with data storage servers.

In this second phase, depicted in FIG. 9, the applications 85 will be launched with the acceleration library which will be parametrized using the analysis of the previous behavior stored in the knowledge base stored in the archive space 81. The acceleration library will then indicate to the file system how to distribute the file slices over the disk spaces in order to avoid future conflicts of access and thereby optimize the performance in terms of duration of execution, in particular.

Naturally, this invention is not limited to the examples and embodiments described and shown, but rather is subject to numerous variations accessible to the person skilled in the art.

The invention claimed is:

1. A storage method for storing, on data servers, data file slices from the execution of several processes of one or more applications, comprising:
distributing the data file slices over different data servers, where distributing results in the data file slices subsequently accessed simultaneously by different application processes being stored on different data servers so as to reduce the subsequent access, to each of all or part of these data servers by too many application processes simultaneously,
wherein a determination of the data file slices accessed simultaneously by different application processes has been carried out, during a prior phase of executing these application processes, by observing the behavior of these application processes in order to access these stored data file slices over time.

2. The storage method according to claim 1, wherein:
distributing the stored data file comprises distributing the stored data file slices over different data server storage spaces, where the distributing results in the data file slices subsequently accessed simultaneously by different application processes being stored on different data server storage spaces, so as to reduce the subsequent access, to each of all or part of these storage spaces by too many application processes simultaneously.

3. The storage method according to claim 1, wherein the determination of the data file slices simultaneously accessed by different application processes has been carried out, during a prior phase of execution of these processes for a single application or else application by application in the case of a plurality of applications, by observing the behavior of these processes of a single application at the same time in order to access these stored data file slices over time.

4. The storage method according to claim 1, wherein the one or more applications are portable to other types of data storage servers.

5. The storage method according to claim 1, wherein the processes of the application include repetitive calculations.

6. The storage method according to claim 5, wherein the repetitive calculations include calculations of weather forecasts.

7. The storage method according to claim 1, wherein the one or more applications are executed within a network comprising at least 5000 calculation nodes.

8. The storage method according to claim 1, wherein a maximum file slice size that can be stored in one go and a maximum number of storage spaces on which this file can be stored are associated with each file, wherein a maximum file slice size being less than 2 MB, the maximum number of storage spaces being less than 10.

9. The storage method according to claim 1, wherein the distribution of stored data file slices over different data servers or over different storage spaces of different data servers is carried out by a library of functions which:
intercepts the creation of data files, and
carries out the storage of the slices of these data files on the storage spaces on the data servers associated therewith during said prior phase of execution of the application processes.

10. A method for executing several processes of one or more applications, comprising:
a first phase of observing the running of said processes and a manner in which said processes access, over time, stored data during said execution, during which a determination of data file slices accessed simultaneously by different application processes is carried out,
a second phase of parametrization of the storage of the data by said processes on data servers and on storage spaces thereof, associating, with the data file slices storage spaces on the data servers, a third phase of distributing stored data file slices over different data servers and over the storage spaces thereof, this distribution being carried out such that the data file slices subsequently simultaneously accessed by different application processes are stored on different data servers, where appropriate on different storage spaces of these data servers so as to reduce the subsequent access, to each of all or part of these data servers, where appropriate of these storage spaces, by too many application processes simultaneously.

11. A storage method for storing, on data servers, data from the execution of several processes, comprising:
distributing stored data over different data servers, distributing resulting in groups of data subsequently accessed simultaneously by different processes being stored on different data servers so as to reduce subsequent access, to each of all or part of these data servers by too many processes simultaneously,
wherein determining which groups of data are accessed simultaneously by different processes has been carried out during a prior phase of executing these processes by observing the behavior of these processes in order to access these groups of stored data over time.

* * * * *